(12) United States Patent
Dar et al.

(10) Patent No.: US 12,236,123 B1
(45) Date of Patent: Feb. 25, 2025

(54) SYSTEM AND METHOD FOR MACHINE LEARNING-TEMPERATURE FORECASTING FOR AUTOMATED TIERING WITHIN A CLOUD STORAGE SYSTEM

(71) Applicant: Dell Products L.P., Round Rock, TX (US)

(72) Inventors: Shaul Dar, Petach Tikva (IL); Ramakanth Kanagovi, Bengaluru (IN); Vishnu Murty Karrotu, Telangana (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/460,996

(22) Filed: Sep. 5, 2023

(51) Int. Cl.
*G06F 3/06* (2006.01)
(52) U.S. Cl.
CPC ............ *G06F 3/0649* (2013.01); *G06F 3/061* (2013.01); *G06F 3/067* (2013.01)

(58) Field of Classification Search
CPC ......... G06F 3/0647–0649; G06F 3/061; G06F 3/067
See application file for complete search history.

(56) References Cited

U.S. PATENT DOCUMENTS

| 9,542,153 B1 * | 1/2017 | Suldhal ................. G06F 3/0605 |
| 2015/0106582 A1 * | 4/2015 | Mai ......................... G06F 12/08 |
| | | 711/165 |

* cited by examiner

*Primary Examiner* — Chie Yew
(74) *Attorney, Agent, or Firm* — Brian J. Colandreo; Heath M. Sargeant; Holland & Knight LLP

(57) ABSTRACT

A method, computer program product, and computing system for forecasting a future temperature for a storage object within a multi-tiered cloud storage system. A cost associated with modifying a tiering of the storage object within the multi-tiered cloud storage system is determined based upon, at least in part, the future temperature forecasted for the storage object. The storage object is tiered in the multi-tiered cloud storage system based upon, at least in part, the cost associated with modifying the tiering of the storage object and a tiering policy associated with the multi-tiered cloud storage system.

18 Claims, 8 Drawing Sheets

SYSTEM AND METHOD FOR MACHINE LEARNING-TEMPERATURE FORECASTING FOR AUTOMATED TIERING WITHIN A CLOUD STORAGE SYSTEM

BACKGROUND

In recent years there has been a growing trend of moving data to cloud storage, from (or in addition to) on-premise storage. Major public cloud providers (e.g., AWS®, Google®, Microsoft®, IBM®) offer a range of storage solutions for blocks, files, and objects.

Cloud storage services offerings have multiple tiers, with a tradeoff between transfer and storage cost and access time, among others. Given the variety in access patterns exhibited by different input/output (IO) workloads, in different times, on the one hand, and the range of cloud storage services with different cost and access tradeoffs, on the other hand, it becomes increasingly difficult for a cloud or multi-cloud provider to optimize the allocation of storage objects (files, blocks, or large objects) to storage tiers, and adapt it as necessary, to maximize applications performance while minimizing cost. Today, cloud providers generally offer simplistic and reactive means to tackle this challenge. For example they provide mechanisms for demoting an object based on its last access time. However the past is often not an accurate predictor of the future.

SUMMARY OF DISCLOSURE

In one example implementation, a computer-implemented method executed on a computing device may include, but is not limited to, forecasting a future temperature for a storage object within a multi-tiered cloud storage system. A cost associated with modifying a tiering of the storage object within the multi-tiered cloud storage system is determined based upon, at least in part, the future temperature forecasted for the storage object. The storage object is tiered in the multi-tiered cloud storage system based upon, at least in part, the cost associated with modifying the tiering of the storage object and a tiering policy associated with the multi-tiered cloud storage system.

One or more of the following example features may be included. Forecasting the future temperate for the storage object may include forecasting the future temperature using a time-series model and a plurality of previous temperature values for the storage object. Forecasting the future temperate for the storage object may include forecasting the future temperature using an unsupervised machine learning model processing a plurality of input/output (IO) requests associated with the storage object. Forecasting the future temperature using the unsupervised machine learning model may include generating a plurality of IO features using the plurality of IO requests associated with the storage object. The plurality of IO features include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. Determining the cost associated with modifying the tiering of the storage object may include one or more of: determining a cost associated with promoting the storage object from a current cloud storage tier to a higher performance cloud storage tier within the multi-tiered cloud storage system; and determining a cost associated with demoting the storage object from the current cloud storage tier to a lower performance cloud storage tier within the multi-tiered cloud storage system. An actual temperature for the storage object for a predefined period of time is determined. An actual cost associated with tiering the storage object in the multi-tiered cloud storage system for the predefined period of time is determined. One or more of the unsupervised machine learning model and the tiering policy are adjusted based upon, at least in part, the actual temperature for the storage object for the predefined period of time, the future temperature for the storage object for the predefined period of time, and the actual costs associated with tiering the storage object for the predefined period of time.

In another example implementation, a computer program product resides on a computer readable medium that has a plurality of instructions stored on it. When executed by a processor, the instructions cause the processor to perform operations that may include, but are not limited to, forecasting a future temperature for a storage object within a multi-tiered cloud storage system. A cost associated with modifying a tiering of the storage object within the multi-tiered cloud storage system is determined based upon, at least in part, the future temperature forecasted for the storage object. The storage object is tiered in the multi-tiered cloud storage system based upon, at least in part, the cost associated with modifying the tiering of the storage object and a tiering policy associated with the multi-tiered cloud storage system.

One or more of the following example features may be included. Forecasting the future temperate for the storage object may include forecasting the future temperature using a time-series model and a plurality of previous temperature values for the storage object. Forecasting the future temperate for the storage object may include forecasting the future temperature using an unsupervised machine learning model processing a plurality of input/output (IO) requests associated with the storage object. Forecasting the future temperature using the unsupervised machine learning model may include generating a plurality of IO features using the plurality of IO requests associated with the storage object. The plurality of IO features include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. Determining the cost associated with modifying the tiering of the storage object may include one or more of: determining a cost associated with promoting the storage object from a current cloud storage tier to a higher performance cloud storage tier within the multi-tiered cloud storage system; and determining a cost associated with demoting the storage object from the current cloud storage tier to a lower performance cloud storage tier within the multi-tiered cloud storage system. An actual temperature for the storage object for a predefined period of time is determined. An actual cost associated with tiering the storage object in the multi-tiered cloud storage system for the predefined period of time is determined. One or more of the unsupervised machine learning model and the tiering policy are adjusted based upon, at least in part, the actual temperature for the storage object for the predefined period of time, the future temperature for the storage object for the predefined period of time, and the actual costs associated with tiering the storage object for the predefined period of time.

In another example implementation, a computing system includes at least one processor and at least one memory architecture coupled with the at least one processor, wherein the at least one processor is configured to forecast a future temperature for a storage object within a multi-tiered cloud storage system. A cost associated with modifying a tiering of the storage object within the multi-tiered cloud storage system is determined based upon, at least in part, the future temperature forecasted for the storage object. The storage object is tiered in the multi-tiered cloud storage system based upon, at least in part, the cost associated with modifying the tiering of the storage object and a tiering policy associated with the multi-tiered cloud storage system.

One or more of the following example features may be included. Forecasting the future temperate for the storage object may include forecasting the future temperature using a time-series model and a plurality of previous temperature values for the storage object. Forecasting the future temperate for the storage object may include forecasting the future temperature using an unsupervised machine learning model processing a plurality of input/output (IO) requests associated with the storage object. Forecasting the future temperature using the unsupervised machine learning model may include generating a plurality of IO features using the plurality of IO requests associated with the storage object. The plurality of IO features include one or more of: an average amount of time between consecutive IO requests during a time interval; a total amount of IO requests during the time interval; a total amount of bandwidth during the time interval; an average IO request size during the time interval; an average amount of time between consecutive read IO requests during the time interval; a frequency of activity during the time interval; and an average amount of time between active time intervals of the plurality of time intervals. Determining the cost associated with modifying the tiering of the storage object may include one or more of: determining a cost associated with promoting the storage object from a current cloud storage tier to a higher performance cloud storage tier within the multi-tiered cloud storage system; and determining a cost associated with demoting the storage object from the current cloud storage tier to a lower performance cloud storage tier within the multi-tiered cloud storage system. An actual temperature for the storage object for a predefined period of time is determined. An actual cost associated with tiering the storage object in the multi-tiered cloud storage system for the predefined period of time is determined. One or more of the unsupervised machine learning model and the tiering policy are adjusted based upon, at least in part, the actual temperature for the storage object for the predefined period of time, the future temperature for the storage object for the predefined period of time, and the actual costs associated with tiering the storage object for the predefined period of time.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
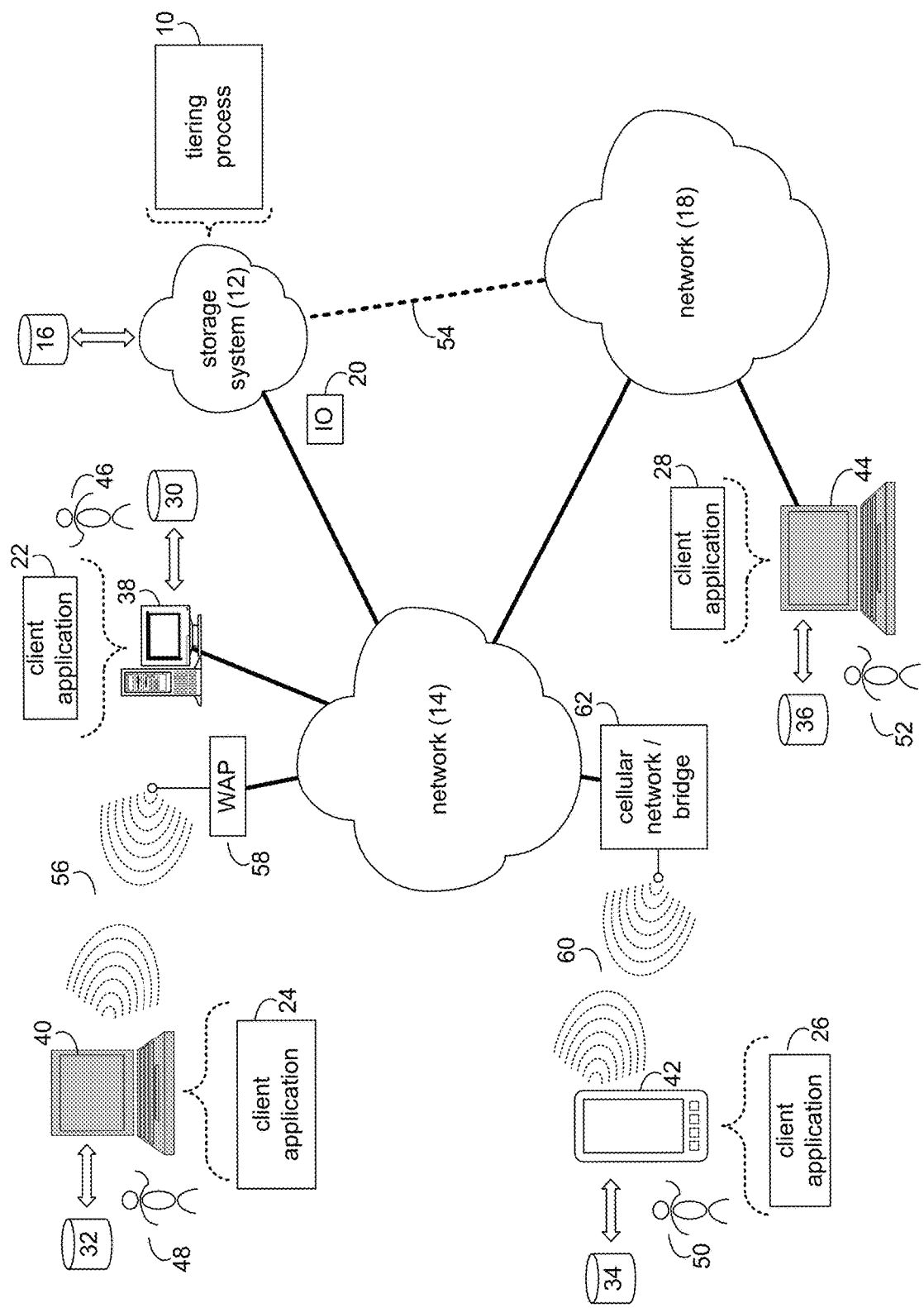
FIG. 1 is an example diagrammatic view of a storage system and a tiering process coupled to a distributed computing network according to one or more example implementations of the disclosure.

System Overview:

Referring to FIG. 1, there is shown tiering process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of tiering process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of tiering process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a tiering process, such as tiering process 10 of FIG. 1, may include but is not limited to, forecasting a future temperature for a storage object within a multi-tiered cloud storage system. A cost associated with modifying a tiering of the storage object within the multi-tiered cloud storage system is determined based upon, at least in part, the future temperature forecasted for the storage object. The storage object is tiered in the multi-tiered cloud storage system based upon, at least in part, the cost associated with modifying the tiering of the storage object and a tiering policy associated with the multi-tiered cloud storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
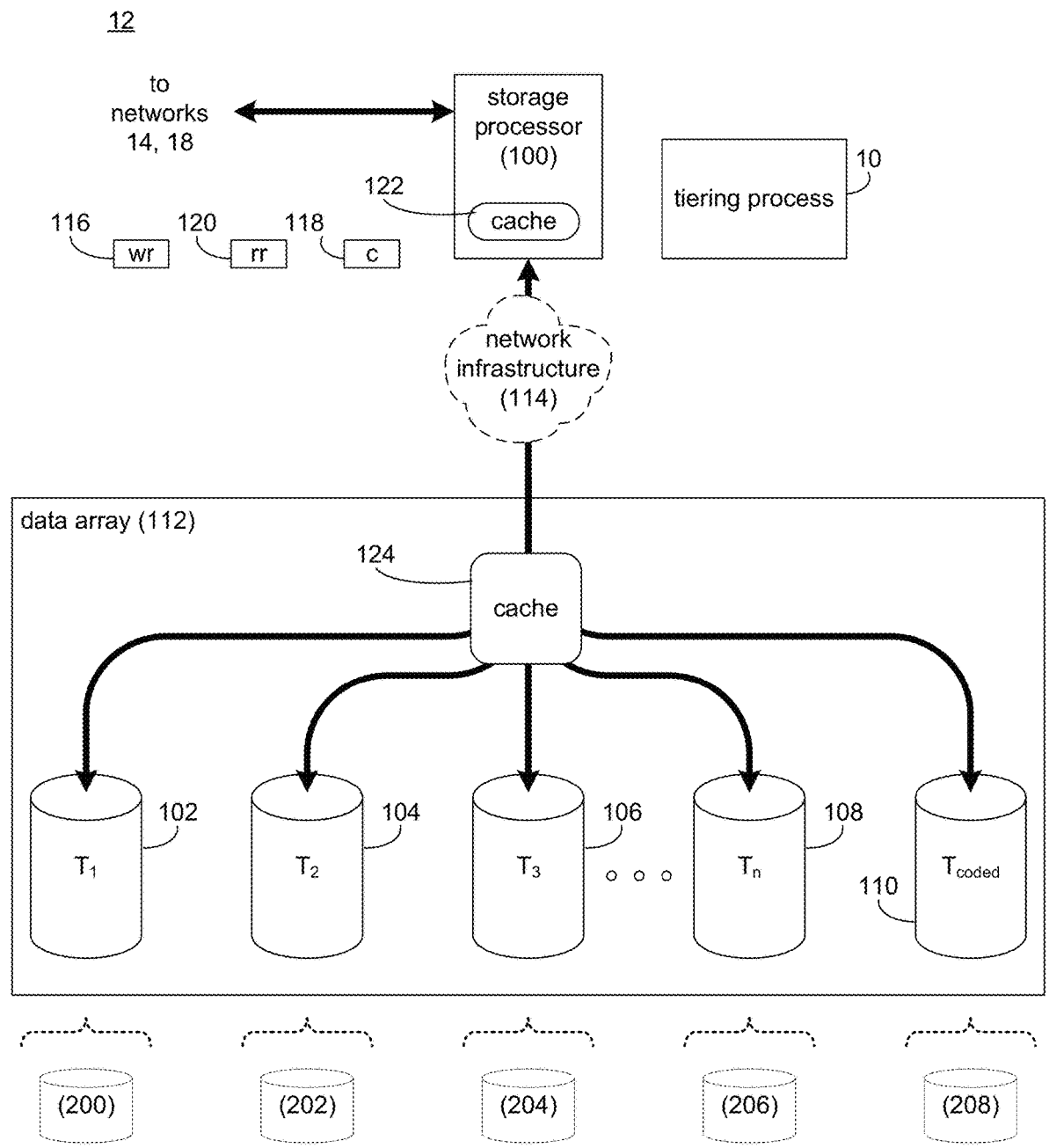
FIG. 2 is an example diagrammatic view of the storage system of FIG. 1 according to one or more example implementations of the disclosure.
Figure 3:
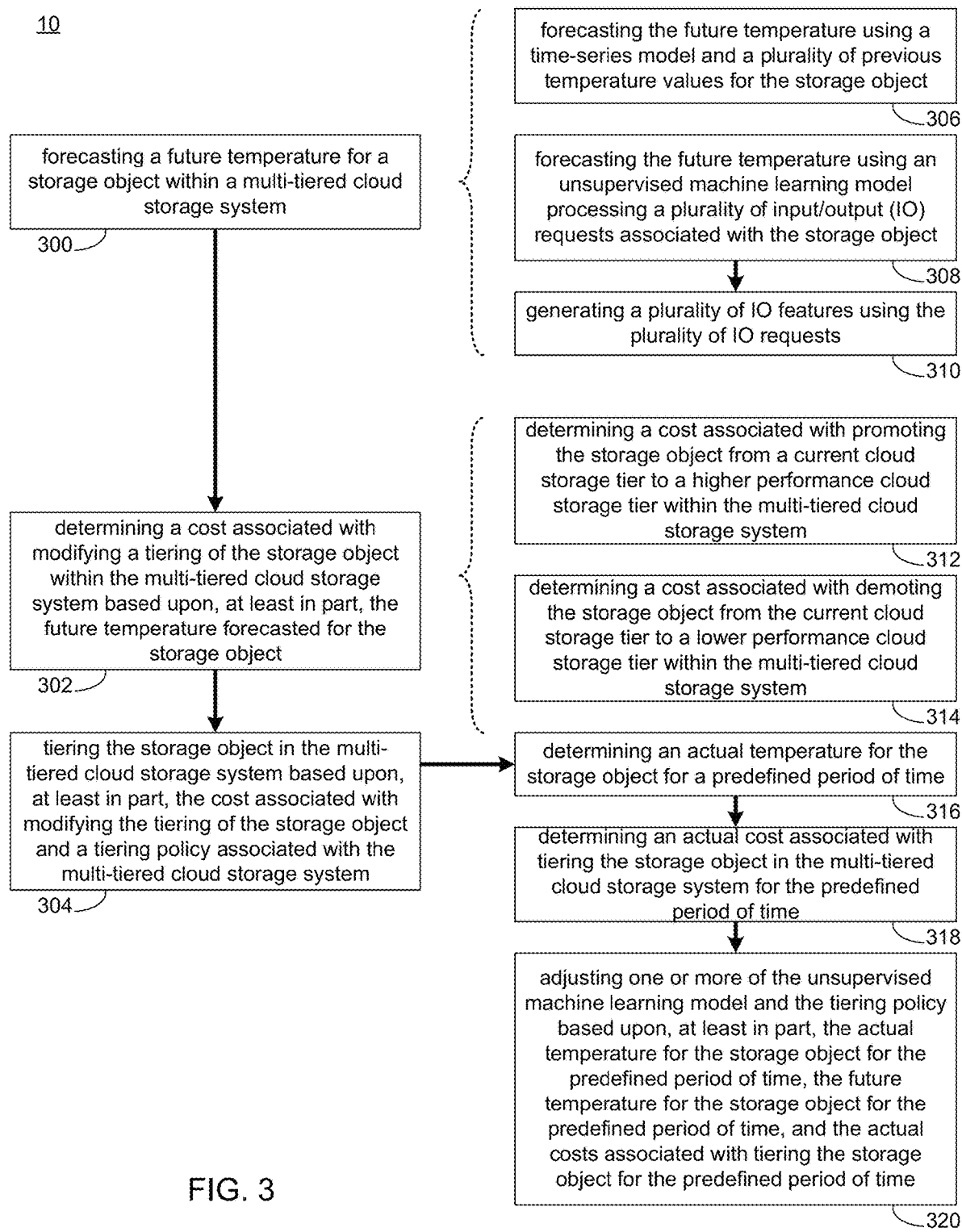
FIG. 3 is an example flowchart of tiering process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of tiering process 10. The instruction sets and subroutines of tiering process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of tiering process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of tiering process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of tiering process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Tiering Process:

Referring also to the examples of FIGS. 3-8 and in some implementations, tiering process 10 may forecast 300 a future temperature for a storage object within a multi-tiered cloud storage system. A cost (e.g., a long-term cost estimate) associated with modifying the tiering of the storage object within the multi-tiered cloud storage system is determined 302 based upon, at least in part, the future temperature forecasted for the storage object. The storage object is placed or tiered 304 in the multi-tiered cloud storage system based upon, at least in part, the cost associated with modifying the tiering of the storage object and, in general, tiering policies associated with the multi-tiered cloud storage system.

As will be discussed in greater detail below, implementations of the present disclosure may allow for automatic tiering within a multi-tiered cloud storage system by forecasting future temperature values for storage objects over extended periods of time and optimizing the tiering of those storage objects using a cost model that balances limited cloud storage resources and the associated costs for tiering data across multiple tiers. For example, the tiering of storage objects in a multi-tiered cloud storage system, unlike the tiering of storage objects in a cache memory system, is constrained by minimum tiering durations and associated costs for tiering in each tier. As such, implementations of the present disclosure forecast a storage object's "temperature" (i.e., likelihood of activity in terms of a number of input/output (IO) operations performed on the storage object in a predefined period of time, the total number of data transferred, or other metric of access) for a period of time associated with multi-tiered cloud storage systems and tier the storage objects using the forecasted temperature and a cost model in order to optimize the storage of storage objects within the multi-tiered cloud storage system. In this manner, multi-tiered cloud storage systems are improved by dynamically tiering storage objects using a forecast temperature and cost model.

In some implementations, tiering process 10 forecasts 300 a future temperature for a storage object within a multi-tiered cloud storage system. Storage objects (e.g., storage objects 400, 402, 404, 406) may generally include any container or storage unit configured to store data within a multi-tiered cloud storage system. For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Figure 4:
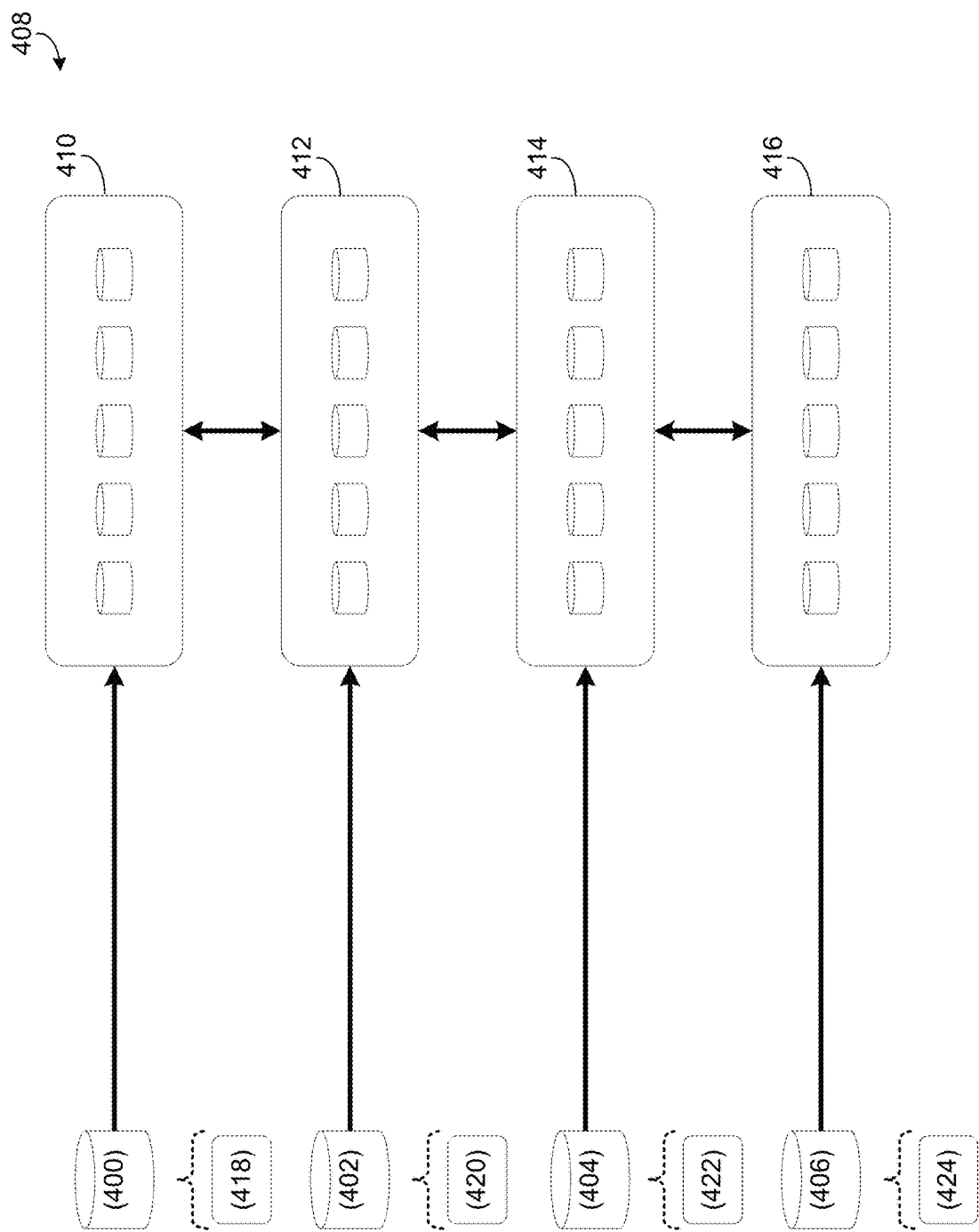
FIG. 4 is an example diagrammatic view of a multi-tiered cloud storage system according to one or more example implementations of the disclosure.

In some implementations, tiering process 10 forecasts 300 a future temperature for a storage object (e.g., storage objects 400, 402, 404, 406) within a multi-tiered cloud storage system. A multi-tiered cloud storage system (e.g., multi-tiered cloud storage system 408) is a storage system deployed in a cloud environment that is accessible to host computing devices and other storage devices across a network connection. Multi-tiered cloud storage system 408 includes a plurality of cloud storage tiers (e.g., cloud storage tiers 410, 412, 414, 416) corresponding to different performance levels. In one example as shown in FIG. 4, multi-tiered cloud storage system 408 includes or has access to e.g., four different cloud storage tiers (e.g., cloud storage tiers 410, 412, 414, 416) with four different performance levels. For example, cloud storage tier 410 may be associated with a high performance cloud storage tier (e.g., for frequently accessed or short lived data); cloud storage tier 412 may be associated with a mid-level performance cloud storage tier (e.g., infrequently accessed data); cloud storage tier 414 may be associated with a low performance cloud storage tier (e.g., rarely accessed data); and cloud storage tier 416 may be associated with the lowest performance cloud storage tier (e.g., data archives, disaster recovery, etc.). However, tiering process 10 may provide for tiering between any number of or type of cloud storage tiers within a multi-tiered cloud storage system within the scope of the present disclosure.

In some implementations, as each storage object may be accessed at various times and frequencies throughout the life cycle of the storage object, tiering process 10 may tier or retier the storage object in various cloud storage tiers within multi-tiered cloud storage system 408 corresponding to the degree that the storage object is accessed or predicted to be accessed. Accordingly, tiering process 10 may forecast or predict a temperature value indicative of the likelihood that a storage object will be accessed within a particular time frame. In some implementations and as will be discussed in greater detail below, tiering process 10 forecasts 300 a future temperature for a storage object for a predefined period of time indicating a likelihood that the storage object will be accessed during that predefined period of time. As discussed above and unlike a cache storage system, a multi-tiered cloud storage system may have minimum occupancy durations for storage objects in each cloud storage tier. For example, while cloud storage tier 410 is associated with a high performance cloud storage tier (e.g., for frequently accessed or short lived data), there may not be a minimum occupancy duration for storage objects, other cloud storage tiers (e.g., cloud storage tiers 412, 414, 416) may have a predefined minimum occupancy duration. In this example, suppose that cloud storage tier 412 has a minimum occupancy duration of thirty days, cloud storage tier 414 has a minimum occupancy duration of ninety days, and cloud storage tier 416 has a minimum occupancy duration of three hundred sixty five days. Accordingly, tiering process 10 may forecast 300 a future temperature indicative of the likelihood that a storage object will be accessed within a time frame based upon, at least in part, the minimum occupancy duration(s) associated with cloud storage tiers.

In some implementations, forecasting 300 the future temperate for the storage object includes forecasting 306 the future temperature using a time-series model and a plurality of previous temperature values for the storage object. As discussed above, a future temperature is a prediction of the likelihood that a storage object will be accessed within a particular time frame. For example and as discussed above, the particular time frame may correspond to the minimum occupancy duration defined for a cloud storage tier. In other words, tiering process 10 may forecast 306 the likelihood that a storage object will be accessed during the minimum occupancy duration. In some implementations, tiering process 10 forecasts 306 the future temperate using a time-series model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure.

Figure 5:
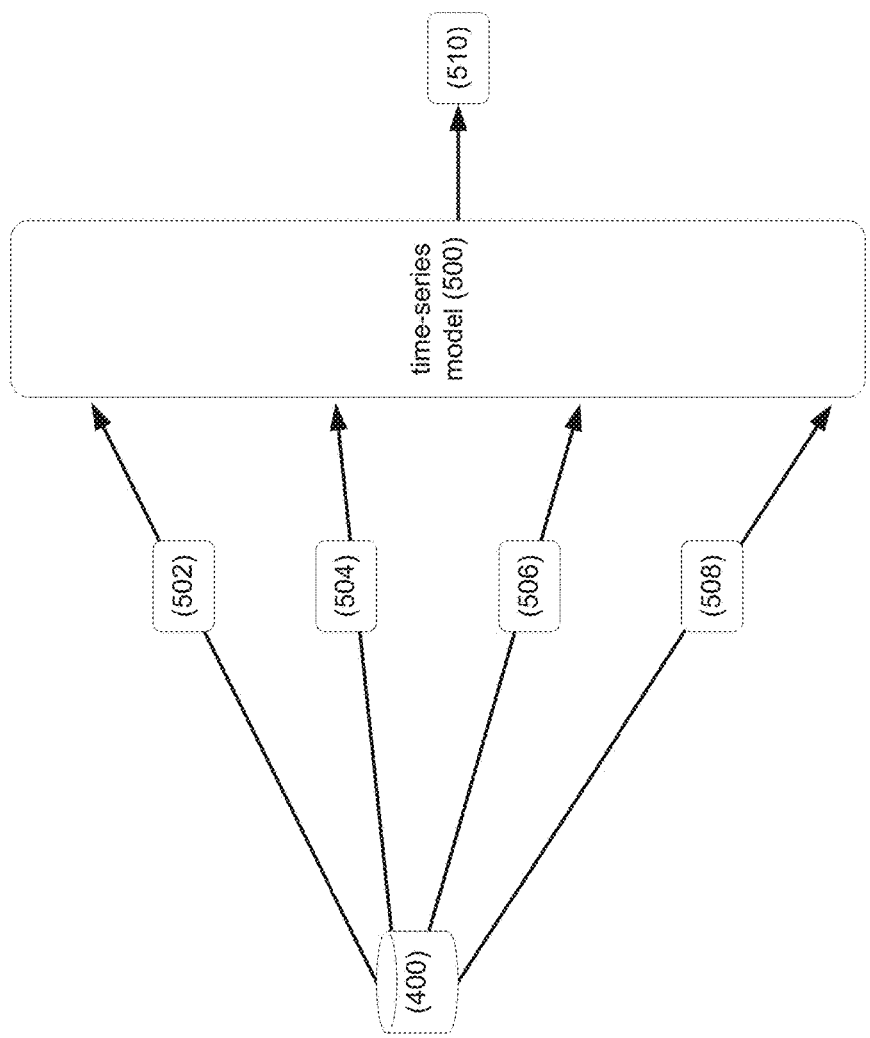
FIG. 5 is an example diagrammatic view of a time-series model according to one or more example implementations of the disclosure.

Referring also to FIG. 5 and in some implementations, tiering process 10 may forecast 306 the future temperature for a storage object (e.g., storage object 400) using a time-series model (e.g., time-series model 500). For example, time-series model 500 uses previous temperature values (e.g., previous temperature values 502, 504, 506, 508) to forecast a future temperature (e.g., future temperature 510). In one example, time-series model 500 uses a combination of existing time-series methods (e.g., moving average, autoregressive, autoregressive moving average, etc.) with a walk-forward mechanism (i.e., a form of supervised learning) to obtain the best performance (i.e., most accurately representative of actual temperature) for different time-related patterns (e.g., stable temperature (level of activity) over time, bursts of different temperatures over time representative of bursts of activity over time, erratic temperatures over time representative of erratic activity over time, trend-based temperatures over time representative of trend-based levels of activity, seasonal temperatures over time representative of seasonal activity, cyclical temperatures over time representative of cyclical activity, etc.).

In some implementations, forecasting 300 the future temperature for the storage object includes forecasting 308 the future temperature using an unsupervised machine learning model processing a plurality of input/output (IO) requests associated with the storage object. For example, an unsupervised machine learning model may forecast 308 the future temperature by processing or sampling the plurality of IO requests or IO traces to generate a plurality of IO features. As will be discussed in greater detail below, using the plurality of IO features that model the relationship between IO requests and storage object access, the unsupervised machine learning model can forecast 308 the future temperature for the storage object.

In some implementations, forecasting 308 the future temperature using the unsupervised machine learning model includes generating 310 a plurality of IO features using the plurality of IO requests associated with the storage object. For example, tiering process 10 processes a plurality of input/output (IO) requests associated with a plurality of storage objects of a multi-tiered cloud storage system. For example and referring again to FIG. 4, during the operation of a multi-tiered cloud storage system, IO operations may be generated for processing data on various storage objects (e.g., storage objects 400, 402, 404, 406). As discussed above, storage objects (e.g., storage objects 400, 402, 404, 406) may generally include any container or storage unit configured to store data within a multi-tiered cloud storage system.

Figure 6:
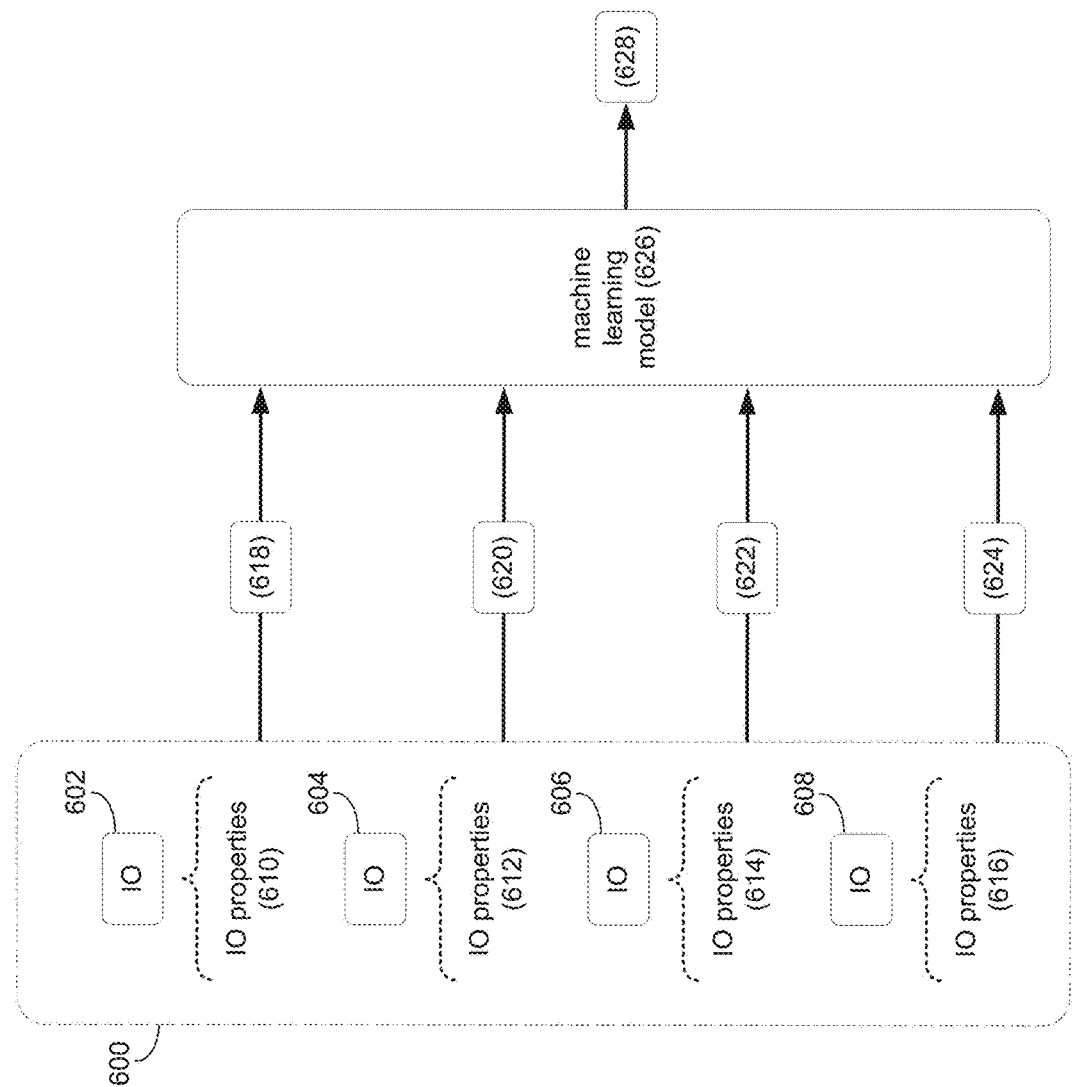
FIG. 6 is an example diagrammatic view of the training of an unsupervised machine learning model according to one or more example implementations of the disclosure.

Referring also to FIG. 6, a plurality of IO requests (e.g., plurality of IO requests 600) may include e.g., four IO requests associated with various storage objects and/or the same storage object. IO request 602 may include a request to perform a read IO operation on a first storage object (e.g., storage object 400); IO request 604 may include a request to perform a write IO operation on storage object 400; IO request 606 may include a request to perform a read IO operation on storage object 400; and IO request 608 may include a request to perform an operation on storage object 400. While four separate IO requests for a single storage object have been described, it will be appreciated that this is for example purposes only and that any number of IO requests may be received for any number of storage objects within the present disclosure.

In some implementations, tiering process 10 generates 310 a plurality of IO features using the plurality of IO requests associated with the storage object. An IO feature is a representation of a plurality of IO properties associated with a particular storage object over a period of time. In some implementations, an IO feature is used by a machine learning model to identify trends concerning the activity of a storage object (i.e., the manner in which a storage object is accessed relative to IO requests). Examples of IO features include, but are not limited to, a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, tiering process 10 generates 310 a plurality of IO features using the plurality of IO requests that are especially meaningful for tiering storage objects in a multi-tiered cloud storage system. For example, tiering process 10 may generate 310 an IO feature for an average amount of time between consecutive IO requests during each time interval; and IO feature for a total amount of IO requests during each time interval; an IO feature for a total amount of bandwidth during each time interval; an IO feature for an average IO request size during each time interval; an IO feature for an average amount of time between consecutive read IO requests during each time interval; an IO feature for a frequency of activity during each time interval; and/or an IO feature for an average amount of time between active time intervals of the plurality of time intervals.

In some implementations, tiering process 10 generates 310 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, tiering process 10 may extract various IO properties associated with the plurality of IO requests. Referring again to FIG. 6 and in some implementations, tiering process 10 may extract one or more IO properties from plurality of IO requests 600. For example, tiering process 10 may extract IO properties 618 from IO request 602; IO properties 620 from IO request 604; IO properties 622 from IO request 606; and IO properties 624 from IO request 608.

In some implementations, generating 310 the plurality of IO features using the plurality of IO requests includes aggregating the plurality of IO requests periodically, and generating the plurality of IO features using the aggregated plurality of IO requests. For example, tiering process 10 may aggregate the one or more IO properties periodically to optimize for memory/storage requirements and/or CPU costs. Additionally, tiering process 10 may use a sampling approach where IO properties for every "n"th IO request are extracted. In some implementations, the number of IO requests between extracting the one or more IO properties may be user-defined, a default number of IO requests, and/or defined automatically by tiering process 10. In this manner, tiering process 10 may limit the amount of processing of IO requests to generate IO features by sampling and aggregating a limited set of all of the IO requests received at the storage system. Referring again to FIG. 6 and in some implementations, tiering process 10 may aggregate IO properties 610 from IO request 602; IO properties 612 from IO request 604; IO properties 614 from IO request 606; and IO properties 616 from IO request 608 and generate a plurality of IO features (e.g., IO features 618, 620, 622, 624).

In some implementations, tiering process 10 processes the plurality of IO features using an unsupervised machine learning model. Referring again to FIG. 6 and in some implementations, tiering process 10 may process the plurality of IO features (e.g., IO features 618, 620, 622, 624) using a machine learning model (e.g., machine learning model 626).

In some implementations, tiering process 10 may process, using the unsupervised machine learning model, the plurality of IO features (e.g., IO features 618, 620, 622, 624) to define a temperature value (e.g., temperature 628) for one or more storage objects of the storage system. For example, the machine learning model may forecast or predict a temperature value of each storage object, which may be correlated with activity. In this manner, the temperature value may be an indication of a temperature associated with the storage object. For example, if a storage object is accessed more frequently, IO requests for that storage object will be most efficiently processed using a higher performance cloud storage tier. By contrast, if a storage object is accessed infrequently, IO requests for that storage object may be efficiently processed using a lower performance cloud storage tier.

In some implementations, the machine learning model may be used for regression. For example, ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for processing the one or more IO features to define a temperature value for one or more storage objects of the storage system within the scope of the present disclosure.

In some implementations, the one or more machine learning models may be configured for one or more of: offline training and continuous training. Offline training may generally include a one-time or single training of the one or more machine learning models with training data that is performed separately from the processing of non-training data. Continuous training may generally include changing or updating the one or more machine learning models data comes in, e.g. with every "n"th IO request. Tiering process 10 may also guide the training process to acquire more useful data using active learning. For example, tiering process 10 can sample with higher frequency the storage objects in which the quality of the current data is low.

Referring again to FIG. 4 and in some implementations, tiering process 10 forecasts 300 the future temperature for a storage object (e.g., storage objects 400, 402, 404, 406). In this example, suppose that tiering process 10 forecasts 300 a future temperature (e.g., future temperature 418) for storage object 400; future temperature 420 for storage object 402; future temperature 422 for storage object 404; and future temperature 424 for storage object 406. As will be discussed in greater detail below, tiering process 10 forecasts 300 future temperatures 418, 420, 422, 424 for storage objects 400, 402, 404, 406, respectively for particular future periods of time.

In some implementations, tiering process 10 determines 302 a cost associated with modifying a tiering of the storage object within the multi-tiered cloud storage system based upon, at least in part, the future temperature forecasted for the storage object. For example, a cost associated with modifying the tiering (i.e., positioning of the storage object within multi-tiered cloud storage system) of the storage object may be defined by a long-term cost estimate from a cost model in terms of the cost of storing the storage object per period of time (e.g., $/gigabyte/month), the cost of inserting or updating data within a particular cloud storage tier, and the cost of obtaining or reading data within a particular cloud storage tier. In this manner, the cost associated with modifying the tiering of a storage object includes the long-term costs associated with moving the storage object and retaining the storage object in the new storage tier over an extended period of time (e.g., thirty days, sixty days, a number of months, a number of years, etc.).

In some implementations, determining 302 the cost associated with modifying the tiering of the storage object includes one or more of: determining 312 a cost associated with promoting the storage object from a current cloud storage tier to a higher performance cloud storage tier within the multi-tiered cloud storage system, and determining 314 a cost associated with demoting the storage object from the current cloud storage tier to a lower performance cloud storage tier within the multi-tiered cloud storage system. For example, tiering process 10 may define a cost model for determining 312 a cost associated with promoting the storage object from a current cloud storage tier to a higher performance cloud storage tier. Promoting a storage object generally includes moving a storage object from a lower performance storage tier to a higher performance storage tier. In one example, tiering process 10 defines a cost model for determining 312 a cost associated with promoting the storage object as shown in Equation 1:

$$\text{cost model}_{promote\ storage\ object} \text{ if future temperature}^* \\ (\text{cost}_{access\text{-}lower\ tier} - \text{cost}_{access\text{-}higher\ tier}) > \\ (\text{cost}_{storage\text{-}higher\ tier} - \text{cost}_{storage\text{-}lower\ tier}) \quad (1)$$

where future temperature is the number of times a storage object is accessed within a predefined period of time, $\text{cost}_{access\text{-}lower\ tier}$ is the cost of accessing a lower performance cloud storage tier, $\text{cost}_{access\text{-}higher\ tier}$ is the cost of accessing a higher performance cloud storage tier, $\text{cost}_{storage\text{-}higher\ tier}$ is the cost of storing the storage object in a higher performance cloud storage tier, and $\text{cost}_{storage\text{-}lower\ tier}$ is the cost of storing the storage object in a lower performance cloud storage tier.

Figure 7:
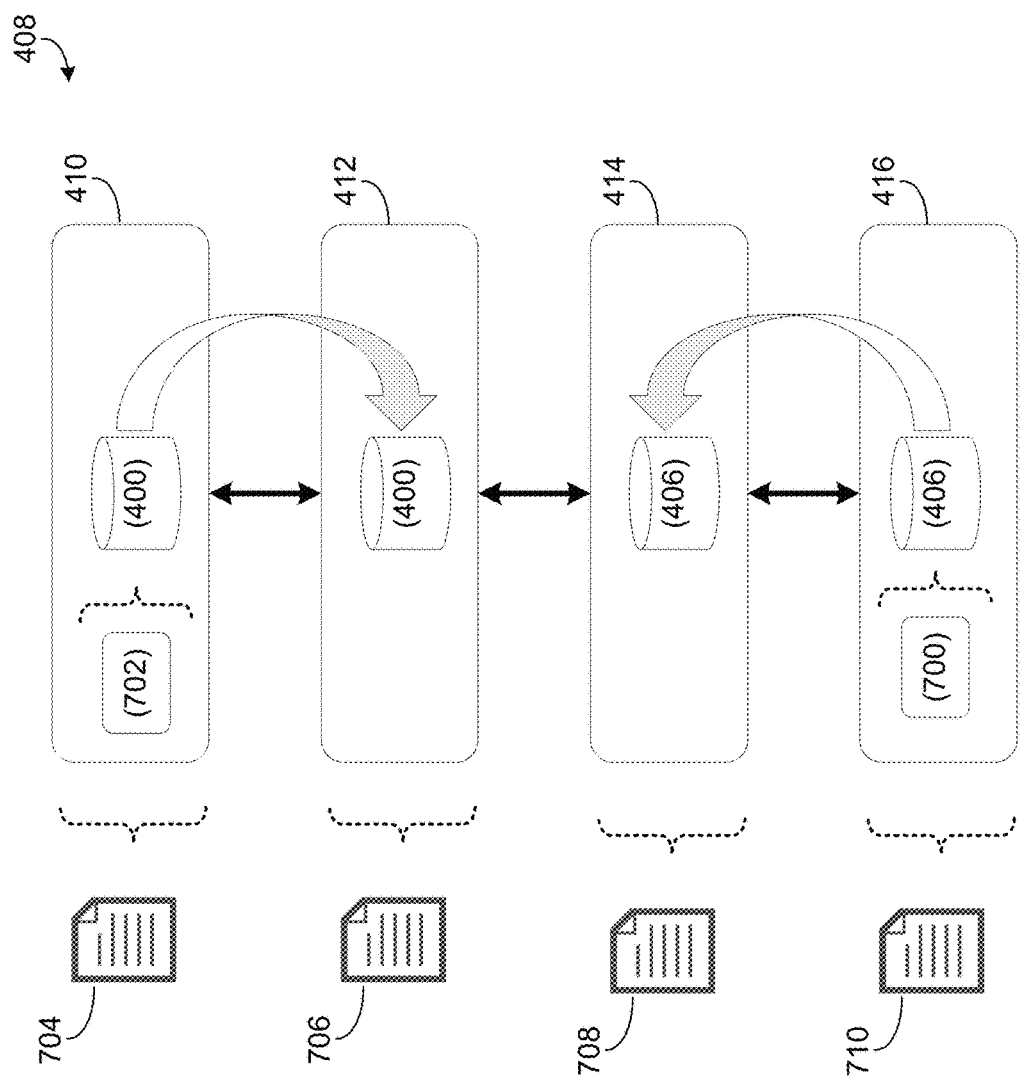
FIGS. 7-8 are example diagrammatic views of tiering within the multi-tiered cloud storage system according to one or more example implementations of the disclosure.

Referring also to FIG. 7, suppose tiering process 10 defines the cost model as shown in Equation 1 and determines 312 a cost (e.g., cost 700) associated with promoting a storage object (e.g., storage object 406) from a lowest performance cloud storage tier (e.g., cloud storage tier 416) to a higher performance cloud storage tier (e.g., cloud storage tier 414). As will be discussed in greater detail below, cost 700 is used to determine if and when to promote storage object 400 from cloud storage tier 414.

In another example, tiering process 10 defines a cost model for determining 314 a cost associated with demoting the storage object as shown in Equation 2:

$$\text{cost model}_{demote\ storage\ object} \text{ if future temperature}^* \\ (\text{cost}_{access\text{-}lower\ tier} - \text{cost}_{access\text{-}higher\ tier}) < \\ (\text{cost}_{storage\text{-}higher\ tier} - \text{cost}_{storage\text{-}lower\ tier}) \quad (2)$$

Demoting a storage object generally includes moving a storage object from a higher performance storage tier to a lower performance storage tier. Referring also to FIG. 7, suppose tiering process 10 defines the cost model as shown in Equation 2 and determines 314 a cost (e.g., cost 702) associated with demoting a storage object (e.g., storage object 400) from a highest performance cloud storage tier (e.g., cloud storage tier 410) to a lower performance cloud storage tier (e.g., cloud storage tier 412). As will be discussed in greater detail below, cost 702 is used to determine if and when to demote storage object 402 from cloud storage tier 410.

In some implementations, tiering process 10 tiers 304 the storage object in the multi-tiered cloud storage system based upon, at least in part, the cost associated with modifying the tiering of the storage object and a tiering policy associated with the multi-tiered cloud storage system. Tiering 304 a storage object in a multi-tiered cloud storage system includes storing or moving the storage object in a cloud storage tier of a plurality of cloud storage tiers of the multi-tiered cloud storage system. In some implementations, tiering 304 a storage object includes modifying or re-tiering the storage object based upon, at least in part, the cost associated with modifying the tiering (e.g., promoting or demoting) and a tiering policy.

A tiering policy may generally include a rule or portion of logic that determines how a storage object is tiered within a multi-tiered cloud storage system. Tiering policies (e.g., tiering policies 704, 706, 708, 710) may be user-defined and/or automatically defined by tiering process 10. As discussed above, tiering policies may utilize the temperature value defined by the one or more machine learning models along with other system parameters (e.g., the tiering hierarchy topology, sizes of various layers, etc.), to optimize tiering decisions. For example, tiering policies may define when to promote or up-tier particular storage objects to a higher performance cloud storage tier based upon, the temperature value defined for the storage objects and performance characteristics of the multi-tiered cloud storage system. Similarly, tiering policies may define when to demote or down-tier particular storage objects to a lower performance cloud storage tier based upon, the temperature value defined for the storage objects and performance characteristics of the multi-tiered cloud storage system. In this manner, tiering process 10 may optimize the tiering of storage objects by enabling particular tiering policies for specific storage objects using the temperature values defined for the storage objects.

In some implementations, tiering process 10 may define a plurality of tiering thresholds based upon, at least in part, the temperature values for each storage object. For example, tiering process 10 may define a first tiering threshold for "cold" storage objects; a second tiering threshold for "warm" storage objects; and a third tiering threshold for "hot" storage objects. While an example of three tiering thresholds has been described (e.g., "cold", "warm", and "hot" thresholds), it will be appreciated that tiering process 10 may define any number of tiering thresholds within the scope of the present disclosure.

Tiering process 10 may define the number of and/or values of the plurality of tiering thresholds in terms of temperature values based upon, at least in part, a defined capacity for each cloud storage tier, the performance capability of each cloud storage tier, the number of cloud storage tiers, and/or data efficiency operations associated with storage of data on a particular cloud storage tier (e.g., data compression, data deduplication, etc. associated with each cloud storage tier). The tiering threshold for each cloud storage tier may be defined with an initial threshold, a default threshold, a user-defined threshold (e.g., input via a user interface), and/or may be an automatically defined threshold (e.g., generated by tiering process 10).

Referring again to FIG. 4 and in some implementations, suppose tiering process 10 defines a high temperature value for storage object 400. Suppose tiering process 10 defines three tiering thresholds. In this example, suppose that the first tiering threshold defines the threshold (e.g., a temperature value of at least 0.95) for tiering storage objects in a high level performance cloud storage tier (e.g., cloud storage tier 410); the second tiering threshold defines the threshold (e.g., a temperature value of at least 0.5) for tiering storage objects in a mid-level performance cloud storage tier (e.g., cloud storage tier 412); and the third tiering threshold defines the threshold (e.g., a temperature value of greater than 0) for tiering storage objects in a low level performance cloud storage tier (e.g., cloud storage tier 414). Accordingly, tiering process 10 may tier storage object 400 into cloud storage tier 410 based upon, at least in part, temperature value 418 defined for storage object 400 (e.g., as temperature value 418 is greater than a first tiering threshold, a second tiering threshold, and a third tiering threshold).

Further suppose that tiering process 10 defines a moderate temperature value for storage object 402 (e.g., temperature value 420). In this example, tiering process 10 may tier storage object 402 into cloud storage tier 412 based upon, at least in part, temperature value 420 defined for storage object 402 (e.g., as temperature value 420 is greater than a first tiering threshold and a second tiering threshold but is less than a third tiering threshold).

In another example, suppose that tiering process 10 defines a low temperature value for storage object 404. In this example, tiering process 10 may tier storage object 404 into cloud storage tier 414 based upon, at least in part, temperature value 422 defined for storage object 404 (e.g., as temperature value 422 is greater than the first tiering threshold but is less than second tiering threshold and the third tiering threshold).

Suppose that tiering process 10 defines, using time-series machine learning model 500 and/or machine learning model 626, a minimum temperature value for storage object 406 because storage object 406 is unlikely to be accessed in the near future, if at all. In this example, tiering process 10 may tier storage object 406 into cloud storage tier 416 based upon, at least in part, temperature value 424 defined for storage object 406. In this example, tiering process 10 may utilize an additional tiering threshold to determine when to tier storage objects to cloud storage tier 416.

Referring again to FIG. 7, tiering process 10 tiers 304 storage object 400 from cloud storage tier 410 to storage object 412 based upon, at least in part, cost 702 associated with demoting storage object 400, tiering policy 704, and tiering policy 706. For example, suppose tiering process 10 determines 302 that cost 702 associated with modifying the tiering of storage object 400 indicates that the cost of demoting storage object 400 from cloud storage tier 410 to cloud storage tier 412 is less than the cost of storing storage object 400 in cloud storage tier 410 in light of a future temperature for storage object 400. Accordingly, tiering process 10 dynamically tiers 304 storage object 400 from cloud storage tier 410 to cloud storage tier 412 because future temperature 418 and cost 702 indicate that it is more efficient to demote storage object 400 to a lower performance cloud storage tier with lower storage costs and more expensive access costs than to retain storage object 400 in a higher performance cloud storage tier with more expensive storage costs.

Continuing with this example, suppose that tiering process 10 tiers 304 storage object 406 from cloud storage tier 416 to cloud storage tier 414 based upon, at least in part, cost 700 associated with promoting storage object 406, tiering policy 708, and tiering policy 710. For example, suppose tiering process 10 determines 302 that cost 700 associated with modifying the tiering of storage object 406 indicates that the cost of promoting storage object 406 from cloud storage tier 416 to cloud storage tier 414 is less than the cost of storing storage object 406 in cloud storage tier 416 in light of a future temperature for storage object 406. Accordingly, tiering process 10 dynamically tiers 304 storage object 406 from cloud storage tier 416 to cloud storage tier 414 because future temperature 424 and cost 700 indicate that it is more efficient to promote storage object 406 to a higher performance cloud storage tier with higher storage costs than to retain storage object 406 in a lower performance cloud storage tier with more expensive access costs (e.g., for updating, inserting, or reading data from storage object 406).

Figure 8:
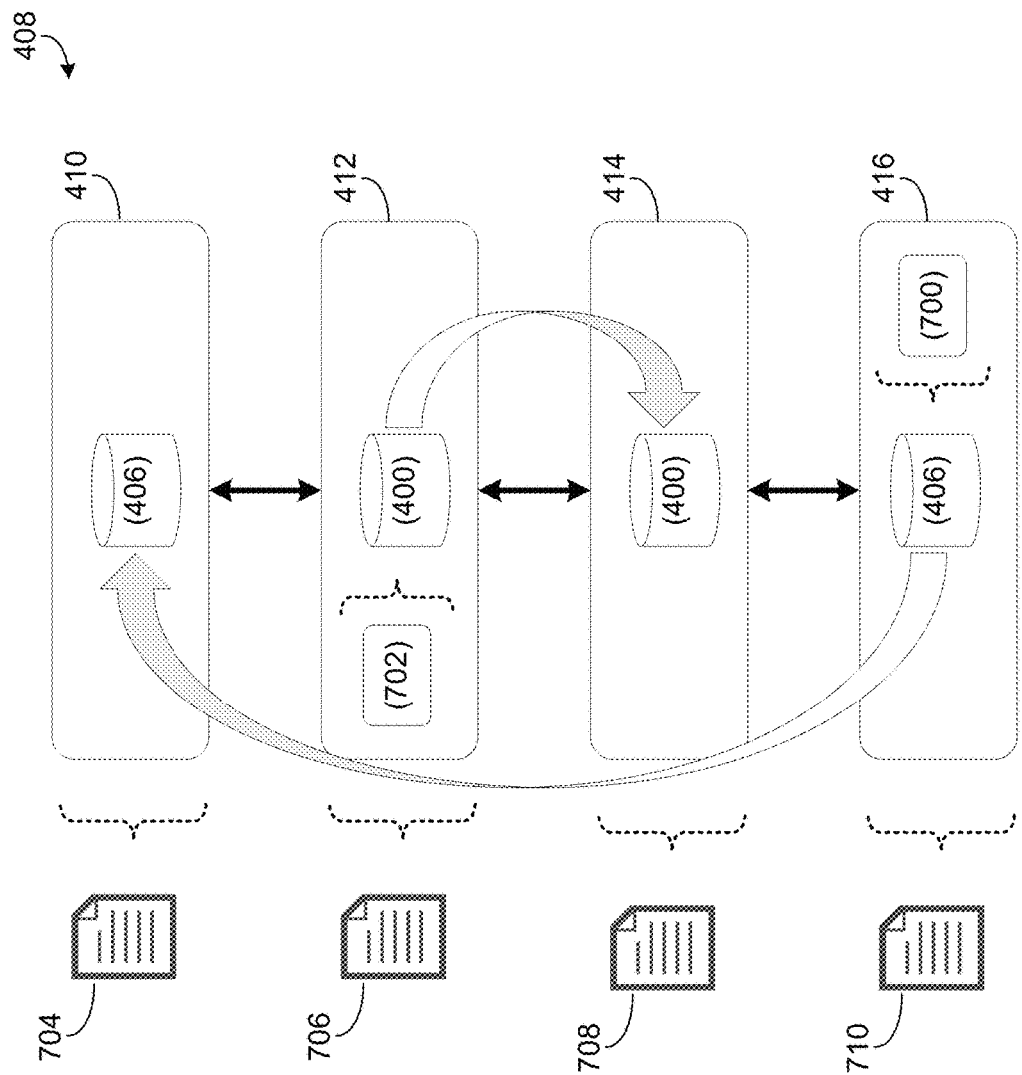

Referring also to FIG. 8, suppose that storage object 406 is tiered in cloud storage tier 416. Now suppose that future temperature 424 for storage object 406 and cost 700 indicate that the cost for promoting storage object 406 to cloud storage tier 410 is less than the cost of accessing storage object 406 from cloud storage tier 416. Accordingly, tiering process 10 tiers 304 storage object 406 by promoting storage object 406 from cloud storage tier 416 to cloud storage tier 410. In another example, suppose that storage object 400 is tiered in cloud storage tier 412. Now suppose that future temperature 418 for storage object 400 and cost 702 indicate that the cost for demoting storage object 400 from cloud storage tier 412 to cloud storage tier 414 is less than the cost of storing storage object 400 in cloud storage tier 412. Accordingly, tiering process 10 tiers 304 storage object 400 by demoting storage object 400 from cloud storage tier 412 to cloud storage tier 414. While several examples of demoting and promoting have been described above, it will be appreciated that tiering 304 the storage objects using future temperature, the cost, and the tiering policy may include promoting and/or demoting storage objects across any number or organization of cloud storage tiers within the scope of the present disclosure.

Implementations of the present disclosure may provide enhanced future forecasting and cost determination to automatically tier storage objects within the multi-tiered cloud storage system. For example, consider two examples with opposite assumptions regarding the size of each storage object. In the first example, suppose that each storage object is a volume with a volume size defined by the maximum logical block address subtracted by the minimum logical block address observed for the storage object (i.e., the volume size is restricted to its recently active part). With this assumption, it is expected that most of the volumes should be promoted to the highest cloud storage tier as the storage object is defined in terms of the most active address space. In the second example, suppose all storage objects are volumes with a fixed size (e.g., one terabyte). As this fixed size includes much more than an observed active part, it is expected that most of the volumes should be demoted to a lower cloud storage tier.

In both examples, the benefits of promotion and demotion are tested. In the promotion test, it is assumed that all volumes are initially placed in cloud storage tier 412 (e.g., cloud storage tier for infrequently accessed data), with the goal that tiering process 10 decides which volumes should be promoted to cloud storage tier 410 (e.g., cloud storage tier for frequently accessed data) for the next e.g., 30 days. As discussed above, promoting a storage object generally includes moving a storage object from a lower performance storage tier to a higher performance storage tier. In the demotion test, it is assumed that all volumes are initially placed in cloud storage tier 410 (e.g., cloud storage tier for frequently accessed data), with the goal that tiering process 10 decides which volumes should be demoted to the cloud storage tier 412 (e.g., cloud storage tier for infrequently accessed data) for the next e.g., 30 days. As discussed above, demoting a storage object generally includes moving a storage object from a higher performance storage tier to a lower performance storage tier.

These examples compared the forecast accuracy (measured retroactively against the actual "future" I/O requests), and projected cost benefits to a theoretical "ideal" case that can "look into the future" (and hence has 100% accuracy), and thus it allows for tiering process 10 to make optimal tiering decisions, and to those achieved using a simple moving average (SMA) method to forecast the future temperature. These results are shown below in Tables 1-2:

TABLE 1

Storage object size = Max(LBA)-Min(LBA)

|  | Ideal | Tiering process 10 | SMA |
|---|---|---|---|
| Accuracy | 100% | 77.53% | 65.84% |
| Promotion from Cloud Storage Tier 412 to Cloud Storage Tier 410 | | | |
| % of volumes Promoted | 70.04% | 91.18% | 36.12% |
| Promotion Savings | 49.20% | 47.60% | 31.38% |
| Demotion from Cloud Storage Tier 410 to Cloud Storage Tier 412 | | | |
| % of volumes Demoted | 29.96% | 8.82% | 63.88% |
| Demotion Savings | 5.55% | 2.57% | -27.58% |

TABLE 2

Storage object size = 1 TB

|  | Ideal | Tiering process 10 | SMA |
|---|---|---|---|
| Accuracy | 100% | 94.11% | 84.28% |
| Promotion from Cloud Storage Tier 412 to Cloud Storage Tier 410 | | | |
| % of volumes Promoted | 17.16% | 17.77% | 1.52% |
| Promotion Savings | 33.11% | 31.63% | 16.69% |
| Demotion from Cloud Storage Tier 410 to Cloud Storage Tier 412 | | | |
| % of volumes Demoted | 82.84% | 82.23% | 98.48% |
| Demotion Savings | 23.94% | 22.26% | 5.27% |

As shown above in Tables 1-2, implementations of tiering process 10 perform extremely well under the assumptions from both examples, and the projected savings for both promotion and demotion were very close to ideal, both in scenarios that called for aggressive tier changes as well as in cases that called for conservatism. In contrast, the SMA method was not only far less effective, but also prone to large errors, as exemplified in particular in the demotion results in Table 1, where it actually led to a projected loss of -27.58%.

In some implementations, tiering process 10 may determine 316 an actual temperature for the storage object for a predefined period of time. For example, tiering process 10 may provide feedback to the unsupervised machine learning model (e.g., machine learning model 626) based upon actual temperatures for the storage object for a predefined period of time. The predefined period of time may be the same as the period of time defined for the future temperature, or a subset of the period of time defined for the future temperature. In this manner, tiering process 10 may determine 316 the actual temperature for the storage object by obtaining or sampling IO requests and access concerning the storage object during the predefined period of time.

In some implementations, tiering process 10 may determine 318 an actual cost associated with tiering the storage object in the multi-tiered cloud storage system for the predefined period of time. For example, tiering process 10 may provide feedback to the cost model based upon actual costs for modifying the tiering of the storage object during the predefined period of time. The predefined period of time may be the same as the period of time defined for the future temperature, as discussed above, or a subset of the period of time defined for the future temperature. In this manner, tiering process 10 may determine 318 the actual cost for modifying the tiering of the storage object by obtaining or requesting cost information (e.g., from a multi-tiered cloud storage system provider) concerning the storage object during the predefined period of time.

In some implementations, tiering process 10 may adjust 320 one or more of the supervised machine learning model and the tiering policy based upon, at least in part, the actual temperature for the storage object for the predefined period of time, the future temperature for the storage object for the predefined period of time, and the actual costs associated with tiering the storage object for the predefined period of time. For example, tiering process 10 adjusts 320 the training data and/or cost model used to forecast the future temperature and the cost associated with modifying the tiering using the future temperature. In this manner, tiering process 10 provides a feedback loop to continuously improve underlying machine learning models and cost models to accurately forecast future temperatures and tier storage objects accordingly within a multi-tiered cloud computing system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    forecasting a future temperature for a storage object within a multi-tiered cloud storage system;
    determining a cost associated with modifying a tiering of the storage object within the multi-tiered cloud storage system based upon, at least in part, the future temperature forecasted for the storage object;
    tiering the storage object in the multi-tiered cloud storage system based upon, at least in part, the cost associated with modifying the tiering of the storage object and a tiering policy associated with the multi-tiered cloud storage system;
    determining an actual temperature for the storage object for a predefined period of time;
    determining an actual cost associated with tiering the storage object in the multi-tiered cloud storage system for the predefined period of time; and
    adjusting one or more of an unsupervised machine learning model and the tiering policy based upon, at least in part, the actual temperature for the storage object for the predefined period of time, the future temperature for the storage object for the predefined period of time, and the actual costs associated with tiering the storage object for the predefined period of time.

2. The computer-implemented method of claim 1, wherein forecasting the future temperature for the storage object includes forecasting the future temperature using a time-series model and a plurality of previous temperature values for the storage object.

3. The computer-implemented method of claim 1, wherein forecasting the future temperature for the storage object includes forecasting the future temperature using the unsupervised machine learning model processing a plurality of input/output (IO) requests associated with the storage object.

4. The computer-implemented method of claim 3, wherein forecasting the future temperature using the unsupervised machine learning model includes generating a plurality of IO features using the plurality of IO requests associated with the storage object.

5. The computer-implemented method of claim 4, wherein the plurality of IO features include one or more of:
    an average amount of time between consecutive IO requests during a time interval;
    a total amount of IO requests during the time interval;
    a total amount of bandwidth during the time interval;
    an average IO request size during the time interval;
    an average amount of time between consecutive read IO requests during the time interval;
    a frequency of activity during the time interval; and
    an average amount of time between active time intervals of the plurality of time intervals.

6. The computer-implemented method of claim 1, wherein determining the cost associated with modifying the tiering of the storage object includes one or more of:
    determining a cost associated with promoting the storage object from a current cloud storage tier to a higher performance cloud storage tier within the multi-tiered cloud storage system; and
    determining a cost associated with demoting the storage object from the current cloud storage tier to a lower performance cloud storage tier within the multi-tiered cloud storage system.

7. A non-transitory computer readable medium comprising a computer program product having a plurality of instructions stored thereon which, when executed by a processor, cause the processor to perform operations comprising:
    forecasting a future temperature for a storage object within a multi-tiered cloud storage system;
    determining a cost associated with modifying a first tiering of the storage object within the multi-tiered cloud storage system based upon, at least in part, the future temperature forecasted for the storage object;
    tiering the storage object in the multi-tiered cloud storage system based upon, at least in part, the cost associated with modifying the first tiering of the storage object and a tiering policy associated with the multi-tiered cloud storage system;
    determining an actual temperature for the storage object for a predefined period of time:
    determining an actual cost associated with tiering the storage object in the multi-tiered cloud storage system for the predefined period of time; and
    adjusting one or more of an unsupervised machine learning model and the tiering policy based upon, at least in part, the actual temperature for the storage object for the predefined period of time, the future temperature for the storage object for the predefined period of time, and the actual costs associated with tiering the storage object for the predefined period of time.

8. The computer program product of claim 7, wherein forecasting the future temperature for the storage object includes forecasting the future temperature using a time-series model and a plurality of previous temperature values for the storage object.

9. The computer program product of claim 7, wherein forecasting the future temperature for the storage object includes forecasting the future temperature using the unsupervised machine learning model processing a plurality of input/output (IO) requests associated with the storage object.

10. The computer program product of claim 9, wherein forecasting the future temperature using the unsupervised machine learning model includes generating a plurality of IO features using the plurality of IO requests associated with the storage object.

11. The computer program product of claim 10, wherein the plurality of IO features include one or more of:
    an average amount of time between consecutive IO requests during a time interval;
    a total amount of IO requests during the time interval;
    a total amount of bandwidth during the time interval;
    an average IO request size during the time interval;
    an average amount of time between consecutive read IO requests during the time interval;
    a frequency of activity during the time interval; and
    an average amount of time between active time intervals of the plurality of time intervals.

12. The computer program product of claim 7, wherein determining the cost associated with modifying the tiering of the storage object includes one or more of:
    determining a cost associated with promoting the storage object from a current cloud storage tier to a higher performance cloud storage tier within the multi-tiered cloud storage system; and
    determining a cost associated with demoting the storage object from the current cloud storage tier to a lower performance cloud storage tier within the multi-tiered cloud storage system.

13. A computing system comprising:
    a memory; and
    a processor configured to forecast a future temperature for a storage object within a multi-tiered cloud storage system, to determine a cost associated with modifying a first tiering of the storage object within the multi-tiered cloud storage system based upon, at least in part, the future temperature forecasted for the storage object, to tier the storage object in the multi-tiered cloud storage system based upon, at least in part, the cost associated with modifying the first tiering of the storage object and a tiering policy associated with the multi-tiered cloud storage system, to determine an actual temperature for the storage object for a predefined period of time, to determine an actual cost associated with tiering the storage object in the multi-tiered cloud storage system for the predefined period of time, and to adjust one or more of an unsupervised machine learning model and the tiering policy based upon, at least in part, the actual temperature for the storage object for the predefined period of time, the future temperature for the storage object for the predefined period of time, and the actual costs associated with tiering the storage object for the predefined period of time.

14. The computing system of claim 13, wherein forecasting the future temperature for the storage object includes forecasting the future temperature using a time-series model and a plurality of previous temperature values for the storage object.

15. The computing system of claim 13, wherein forecasting the future temperature for the storage object includes forecasting the future temperature using the unsupervised machine learning model processing a plurality of input/output (IO) requests associated with the storage object.

16. The computing system of claim 15, wherein forecasting the future temperature using the unsupervised machine learning model includes generating a plurality of IO features using the plurality of IO requests associated with the storage object.

17. The computing system of claim 16, wherein the plurality of IO features include one or more of:
    an average amount of time between consecutive IO requests during a time interval;
    a total amount of IO requests during the time interval;
    a total amount of bandwidth during the time interval;
    an average IO request size during the time interval;
    an average amount of time between consecutive read IO requests during the time interval;
    a frequency of activity during the time interval; and
    an average amount of time between active time intervals of the plurality of time intervals.

18. The computing system of claim 13, wherein determining the cost associated with modifying the tiering of the storage object includes one or more of:
    determining a cost associated with promoting the storage object from a current cloud storage tier to a higher performance cloud storage tier within the multi-tiered cloud storage system; and
    determining a cost associated with demoting the storage object from the current cloud storage tier to a lower performance cloud storage tier within the multi-tiered cloud storage system.

* * * * *